US008862186B2

(12) United States Patent
Jacobsen et al.

(10) Patent No.: US 8,862,186 B2
(45) Date of Patent: *Oct. 14, 2014

(54) LAPEL MICROPHONE MICRO-DISPLAY SYSTEM INCORPORATING MOBILE INFORMATION ACCESS SYSTEM

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/236,098

(22) Filed: Sep. 19, 2011

(65) Prior Publication Data

US 2012/0075177 A1 Mar. 29, 2012

Related U.S. Application Data

(60) Provisional application No. 61/384,941, filed on Sep. 21, 2010.

(51) Int. Cl.
*H04B 1/38* (2006.01)
*G06F 3/01* (2006.01)
*G06F 3/14* (2006.01)

(52) U.S. Cl.
CPC *G06F 3/14* (2013.01); *G06F 3/014* (2013.01); *G06F 3/011* (2013.01); *G09G 2370/16* (2013.01); *G09G 2340/145* (2013.01)
USPC .................................. 455/566; 345/8; 345/156

(58) Field of Classification Search
CPC ....................................................... G06F 3/011
USPC ........................................ 455/566; 345/8, 156
See application file for complete search history.

(56) References Cited

U.S. PATENT DOCUMENTS

| | | | |
|---|---|---|---|
| 5,990,793 | A | 11/1999 | Bieback |
| 6,010,216 | A | 1/2000 | Jesiek |
| 6,084,556 | A * | 7/2000 | Zwern ............................. 345/8 |
| 6,108,197 | A | 8/2000 | Janik |
| 6,204,974 | B1 | 3/2001 | Spitzer |
| 6,325,507 | B1 | 12/2001 | Jannard et al. |
| 6,798,391 | B2 | 9/2004 | Peterson, III |
| 6,853,293 | B2 | 2/2005 | Swartz et al. |

(Continued)

FOREIGN PATENT DOCUMENTS

| | | |
|---|---|---|
| WO | WO 95/21408 | 8/1995 |
| WO | WO 95/23994 | 9/1995 |

(Continued)

*Primary Examiner* — David Bilodeau
(74) *Attorney, Agent, or Firm* — Hamilton, Brook, Smith & Reynolds, P.C.

(57) ABSTRACT

A shoulder mounted lapel microphone housing that encloses a microdisplay, a computer, and other communication system components. A microdisplay element is located on or in the microphone housing. Other electronic circuits, such as a microcomputer, one or more wired and wireless interfaces, associated memory or storage devices, auxiliary device mounts and the like are packaged in the microphone housing and/or in an optional pager sized gateway device having a belt clip. Motion, gesture, and/or audio processing circuits in the system provide a way for the user to input commands to the system without a keyboard or mouse. The system provides connectivity to other computing devices such as cellular phones, smartphones, laptop computers, or the like.

19 Claims, 6 Drawing Sheets

(56) References Cited

U.S. PATENT DOCUMENTS

| | | |
|---|---|---|
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,566 B2 | 4/2011 | Abe |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,184,983 B1* | 5/2012 | Ho et al. ............... 398/130 |
| 2002/0015008 A1 | 2/2002 | Kishida et al. |
| 2002/0030649 A1* | 3/2002 | Zavracky et al. ........ 345/87 |
| 2002/0094845 A1 | 7/2002 | Inasaka |
| 2003/0068057 A1 | 4/2003 | Miller et al. |
| 2005/0264527 A1 | 12/2005 | Lin |
| 2006/0028400 A1* | 2/2006 | Lapstun et al. ............ 345/8 |
| 2006/0061551 A1* | 3/2006 | Fateh ..................... 345/158 |
| 2006/0109237 A1* | 5/2006 | Morita et al. ........... 345/156 |
| 2006/0132382 A1 | 6/2006 | Jannard |
| 2006/0221266 A1* | 10/2006 | Kato et al. ............... 348/838 |
| 2007/0009125 A1* | 1/2007 | Frerking et al. ......... 381/315 |
| 2007/0103388 A1* | 5/2007 | Spitzer ...................... 345/8 |
| 2007/0180979 A1* | 8/2007 | Rosenberg ................ 84/611 |
| 2007/0265495 A1* | 11/2007 | Vayser ..................... 600/109 |
| 2008/0055194 A1* | 3/2008 | Baudino et al. ............. 345/8 |
| 2008/0144854 A1* | 6/2008 | Abreu ....................... 381/74 |
| 2008/0198324 A1 | 8/2008 | Fuziak |
| 2009/0099836 A1* | 4/2009 | Jacobsen et al. ............ 704/3 |
| 2009/0117890 A1* | 5/2009 | Jacobsen et al. ......... 455/419 |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0251409 A1* | 10/2009 | Parkinson et al. ....... 345/156 |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0121480 A1 | 5/2010 | Stelzer et al. |
| 2010/0128626 A1* | 5/2010 | Anderson et al. ....... 370/252 |
| 2010/0141554 A1* | 6/2010 | Devereaux et al. .......... 345/7 |
| 2010/0171680 A1 | 7/2010 | Lapidot et al. |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2011/0001699 A1* | 1/2011 | Jacobsen et al. ......... 345/157 |
| 2011/0089207 A1 | 4/2011 | Tricoukes et al. |
| 2011/0090135 A1 | 4/2011 | Tricoukes et al. |
| 2011/0187640 A1* | 8/2011 | Jacobsen et al. ......... 345/156 |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2012/0068914 A1* | 3/2012 | Jacobsen et al. ............ 345/8 |

FOREIGN PATENT DOCUMENTS

| | | |
|---|---|---|
| WO | WO 2009/076016 | 6/2009 |
| WO | WO 2011/051660 | 5/2011 |
| WO | WO 2012/040386 | 3/2012 |

* cited by examiner

LAPEL MICROPHONE MICRO-DISPLAY SYSTEM INCORPORATING MOBILE INFORMATION ACCESS SYSTEM

RELATED APPLICATION

This application claims the benefit of U.S. Provisional Application No. 61/384,941, filed on Sep. 21, 2010. The entire teachings of the above application(s) are incorporated herein by reference.

TECHNICAL FIELD

The present disclosure relates to configurations for a lapel mount-type microphone package incorporating a high resolution microdisplay and electronics having numerous other capabilities. A selected portion of the circuitry may optionally be packaged into a pager sized enclosure conveniently clipped onto a user's belt.

BACKGROUND

Recently developed microdisplays can provide a large format, high resolution color pictures and streaming video in a very small form factor. One use for such displays is in a head mounted display (HMD) worn on the user's face or head similar to a pair of eyeglasses or headphones. The electronics enclosed in such devices have become extremely sophisticated including integrated data processors, wireless interfaces, and other input devices such as head tracking accelerometers, cameras, voice recognition software and other components.

SUMMARY OF THE INVENTION

While these sophisticated HMD devices provided a rich personal computing environment, they are not without their limitations. In particular, the approach of incorporating all of the system components in a housing that is worn on a user's head has some drawbacks.

Certain industrial workers and public safety personnel, such as repairmen, police, firemen, security guards and the like are not able or willing to wear head or helmet mounted devices. Some of their resistance is because headset devices interfere with their ability to perform certain job related functions. Others may resist in adopting devices with advanced functionality simply to due to lack of familiarity with a headset, preferring more traditional form factors for communications equipment.

Other users are concerned about long-term exposure to high power radio frequency radiation close to their head such as emitted by Bluetooth cellular, 3G and 4G, and WiFi radios. Still other users, having grown accustomed to small Bluetooth headsets, find the additional weight presented by electronic and peripherals such as central processing units, input and output devices, data storage devices, radios, and other peripherals distracting and/or tiring, straining on their head and/or neck muscles and/or otherwise problematic.

In preferred embodiments, a small unit similar to a lapel or shoulder type mounted microphone includes a number of separately and/or uniquely packaged components to provide a sophisticated information access and display system.

The lapel unit incorporates at least microphone input and speaker output devices. A microdisplay element is also located on or in the lapel unit. The lapel unit may also typically have short range (i.e., Bluetooth, WiFi or cellular) communication circuits built into it to receive information, control, audio and video signals.

Additional input peripheral devices such as position, body motion, and/or hand gesture sensors may be included in the unit. Still other electronic circuits, such as a microcomputer, one or more wired and/or wireless interfaces, associated memory or storage devices, auxiliary device mounts and the like can be packaged in the lapel unit to provide full function personal computer and/or smartphone functionality in a shoulder-mount type housing.

In alternative embodiments, some of the circuits implementing these functions are moved to an auxiliary pager sized gateway device which may be worn on a belt. These system components moved to the gateway can include the microcomputer(s), one or more wired and/or higher powered wireless interfaces, associated memory or storage devices, auxiliary device mounts and the like. The belt mounted gateway device may also include cellular radios, WiFi, Bluetooth, microprocessor, memory, batteries and other peripheral devices to provide connections to the lapel unit and other host computers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
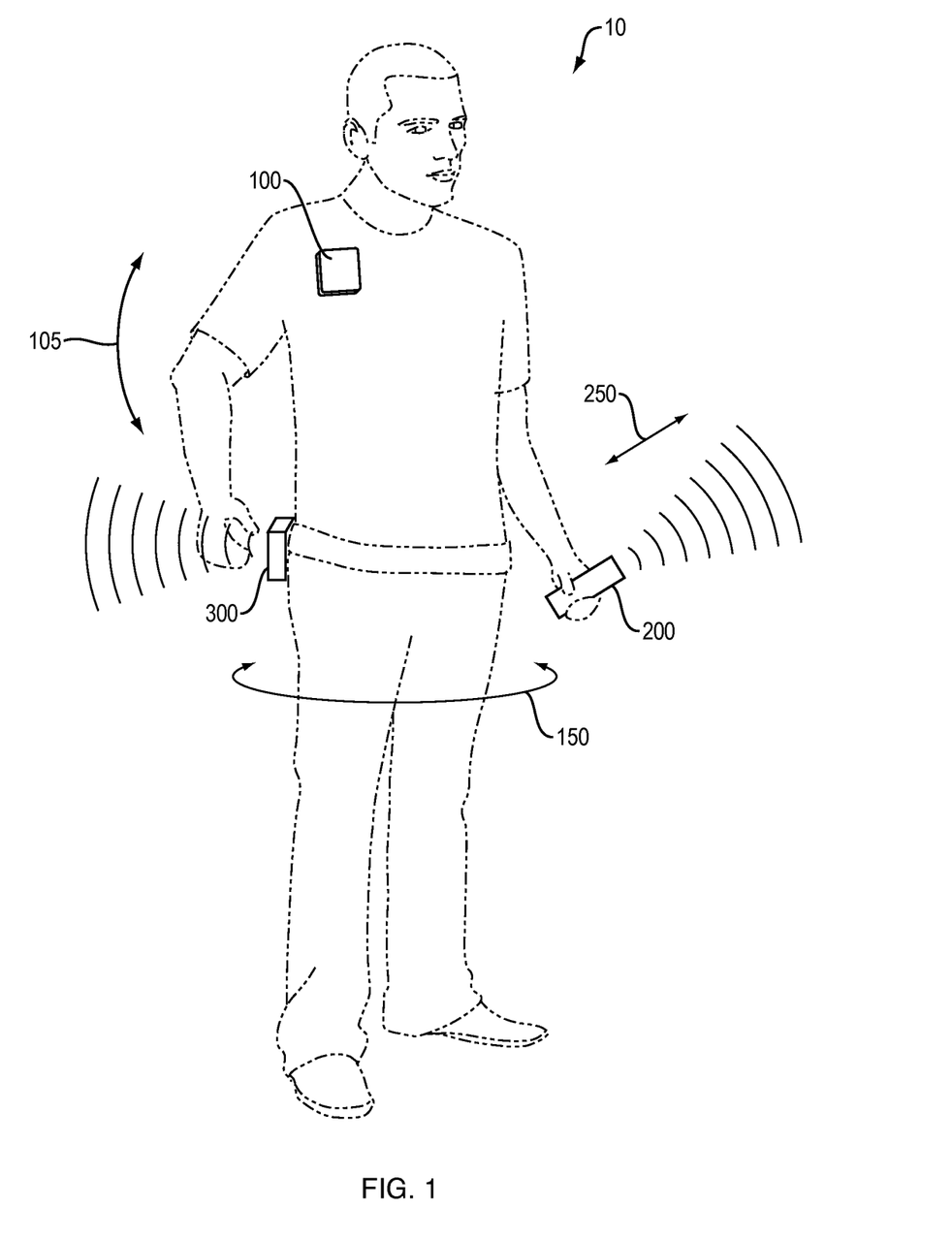
FIG. 1 is a view showing a user wearing the unit on his lapel and having the gateway clipped to his belt.

FIG. 1 shows a remote control wireless lapel mounted display system 10 that incorporates a high resolution (VGA or better) microdisplay element, wireless communication, personal computer, and other features as described more fully below.

Audio input and output devices, including one or more microphone input devices and one or more speaker output devices are included in a shoulder microphone form factor lapel unit 100 adapted to fit on or mounted to the lapel or shoulder of the user.

Typically located in the lapel unit 100 are a microcomputer, video driver circuits and wireless communication circuits such as a Bluetooth, WiFi and/or cellular interface, and other circuits circuit(s). In one embodiment, the lapel unit 100 itself functions as a standalone PC and communications device or remote control for another device or host personal computer. To that end additional audio input processing circuits and other devices, such as one or more position, gesture and/or motion sensors are included in the lapel unit 100. The audio processing circuits, and motion and/or gesture sensors are used to process various inputs to the unit 100 by detecting voice commands and/or tracking the motion of the users body, head or hands.

The system 10 may include an optional gateway 300 for packaging some of the components. The gateway 300 is a small form factor housing of a size similar to a belt-wearable pager. If gateway 300 is used, it can house some of the electronic circuits such as a microcomputer, one or more wired and wireless interfaces, associated memory or storage devices and peripheral mounting slots or connections. When the lapel unit 100 and gateway 300 are both used, they are connected to each other over a wire or over low power wireless connection such as a Bluetooth and/or WiFi link 105.

The system 10, including lapel unit 100 and/or optional gateway 300, may be used in various ways. It may be used as a remote display for streaming video signal provided over another Bluetooth and/or WiFi link 150 from yet another computing device such as a host computing device 200. The host 200 may be a laptop, cell phone, Blackberry®, iPhone®, iPad®, Google® Android®, or other smart phone device having similar or greater computational complexity and/or network connectivity than the system 10 itself For example, a host 200 may be further connected to other networks, such as through a longer range wireless connection 250 to the Internet. However, in other configurations, the lapel unit 100 and/or gateway 300 may themselves had have Bluetooth, WLAN and/or Wide Area Network (WAN) connectivity 250 such as to a 3G cellular or 4G LTE network.

Figure 2A:
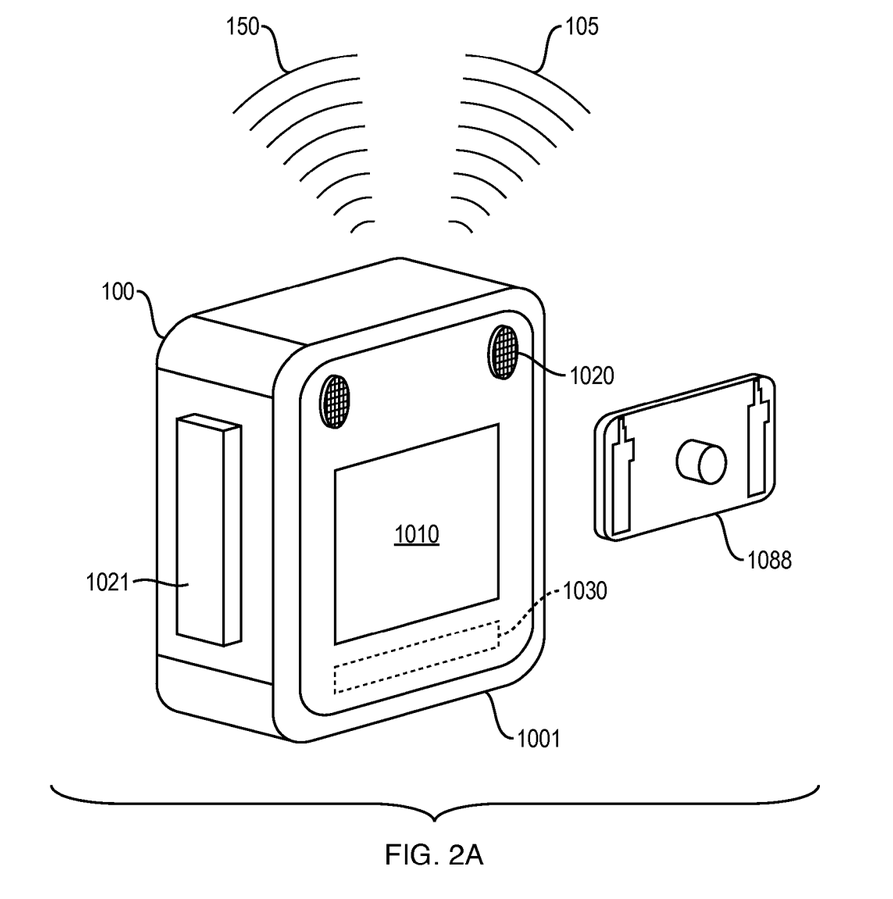
FIG. 2A is a more detailed view of a stand alone lapel unit.

FIG. 2A illustrates an embodiment of the system 10 where a stand alone unit 100 implements the desired personal computer and/or smart phone type functions in the lapel-mount microphone sized package. The housing 1001 takes a familiar shape, size and weight of a shoulder microphone package that is intimately familiar to law enforcement, public safety and security personnel. Included in the housing 1001 are one or more microphones 1020 activated by a push-to-talk switch 1021, speakers 1030, and a microdisplay 1010. Also included are one or more wireless interfaces 105, 150 which may be short range Bluetooth or WiFi interfaces, or long ranges WLAN and/or Wide Area Network (WAN) connectivity such as to a 3G cellular or 4G LTE network. An associated clip 1088 allows removably attaching the housing 1001 to a lapel on the shirt or coat of the user.

Figure 2B:
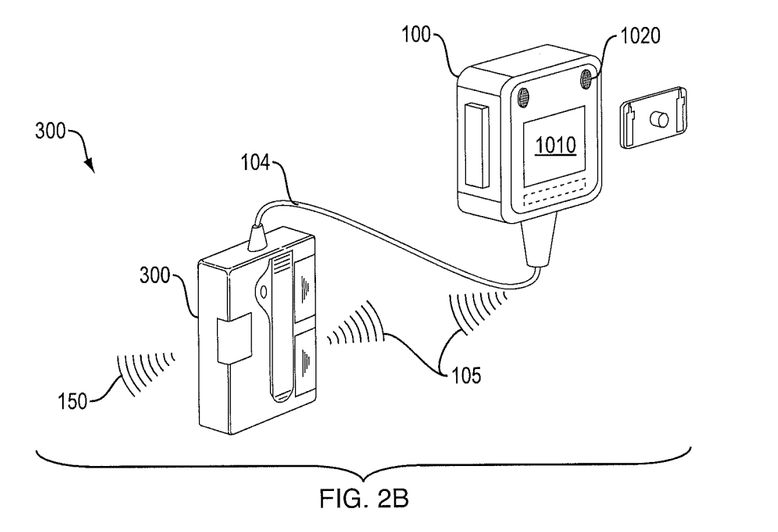
FIG. 2B shows another configuration for the lapel unit and its connection to an optional gateway.
Figure 2C:
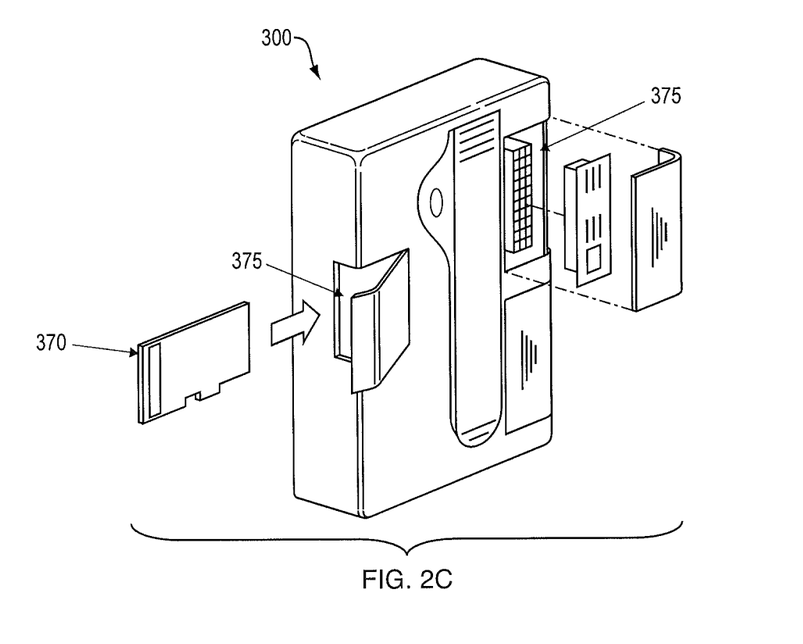
FIG. 2C shows the gateway in more detail.

FIG. 2B illustrates another embodiment of the system where the lapel unit 100 and gateway 300 operate together. A wired 104 or wireless 105 connection is provided between the lapel unit 100 and gateway 300. FIG. 2C is a more detailed view of the gateway 300. There may be one or more slots 375 for accepting additional functionality or personality cards 370. These cards may take the form of a micro SD card, MD card, SIM card and/or printed circuit board modules and may provide functionalities such as cellular connectivity, batteries, additional memory and so forth. Additional optional functionality in the gateway 300 may include additional solid state memory, compact hard drive, memory cards, USB and many USB connectors, Pico-projector, broadcast TV, radio and/or closed circuit audio/video connectivity, displays and the like.

Figure 3:
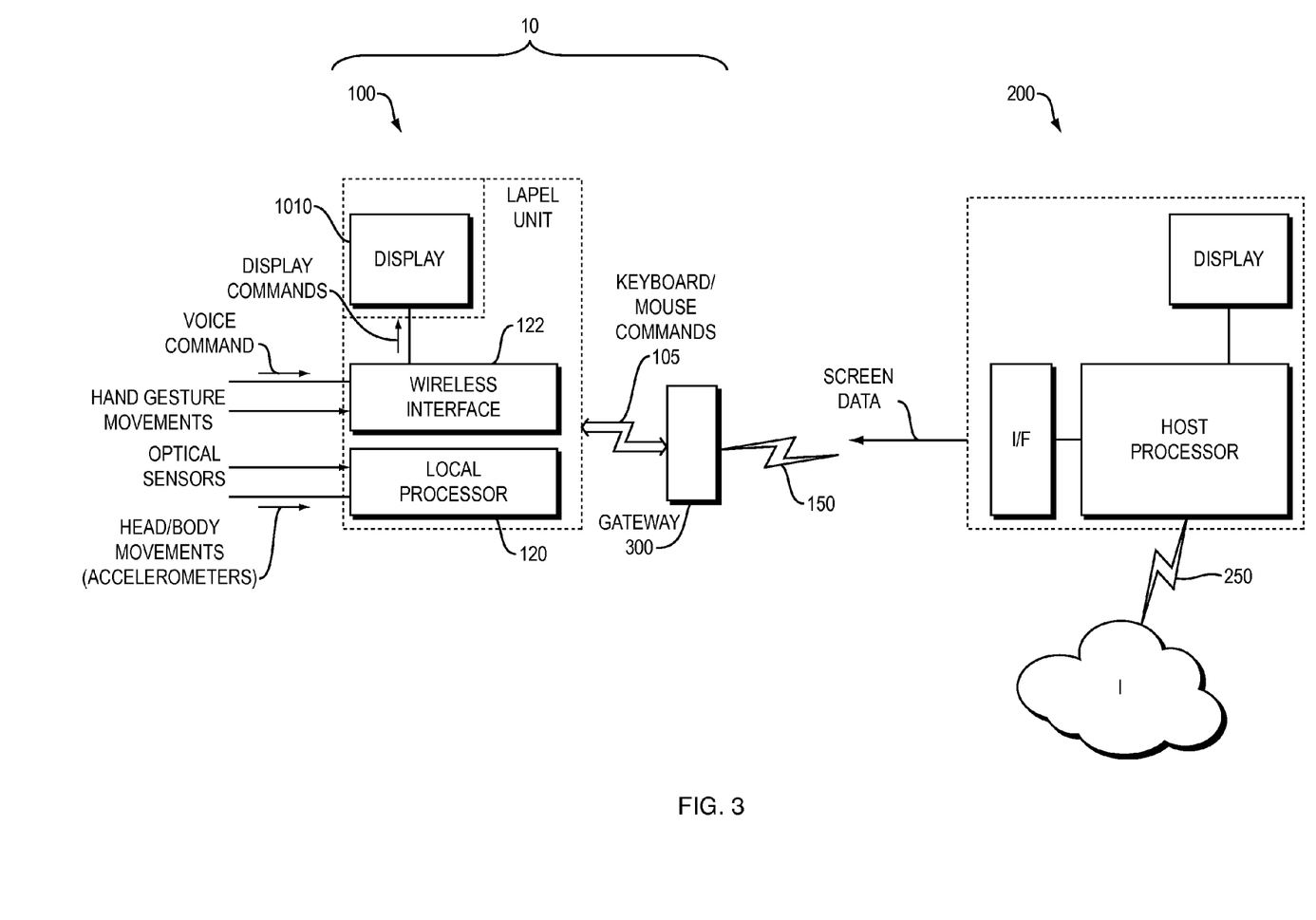
FIG. 3 is a high level functional diagram showing the system and its use as a controller for a host processor such as a smart phone.

Wireless interface 150 in gateway and/or lapel unit 100 enables system 10 to be used as a remote control for a host computing device 200 (see FIG. 3). The host 200 may for example, be a laptop, tablet, cell phone, Blackberry®, iPhone®, Android® or other smart phone device having similar or greater computational complexity and greater network connectivity than the remote control system 10 itself The host 200 may be further connected to other networks, such as through yet another Wide Area Network (WAN) connection 250 to the Internet.

To this end, the optional gateway 300 can also be connected to the host 200 through a suitable wireless connection, such as provided by Bluetooth link 105 or Wireless Local Area Network (WLAN) 150 connection. In embodiments, where the gateway 300 may be eliminated, the lapel unit 100 directly communicates with the host 200, such as via the Bluetooth, WiFi and/or cellular radio connection.

As shown in FIG. 3, the lapel unit 100 includes the aforementioned display 1010, local processor 120, and wireless interface 122. It receives inputs from the user such as voice input via the microphone, and /optionally, body movements and/or hand gestures via the position, motion and/or gesture sensors. These are translated by software in lapel unit 100 or gateway 300 into commands for the local processor 120 in lapel unit 100 or gateway 300 or forwarded to host 200. The local processor and/or host 200 then interprets these inputs in accordance with its own operating system and/or application software to perform various functions.

Among these commands may be to fetch and display a document.

Other commands may be to retrieve information from the Internet and display it such as a web page.

Still other commands may be for the host 200 to select a field of view within a virtual display local to the host 200 and then return that selected screen data to the microdisplay 1010. Thus, it should be understood that a very large format virtual display area may be associated with application software running on or in an operating system running on the host 200 (or local processor 120), and only a portion of that large virtual display area within the field of view selected by user voice commands and/or head movements and/or gestures. Further information concerning functions that can be performed by the device 100 or 300 interacting with the host 200 are explained in a co-pending U.S. patent application entitled " Remote Control of Host Application Using Motion and Voice Commands" dated May 5, 2010, Ser. No. 12/774,179, by the same inventors and incorporated by reference in its entirety herein.

Figure 4:
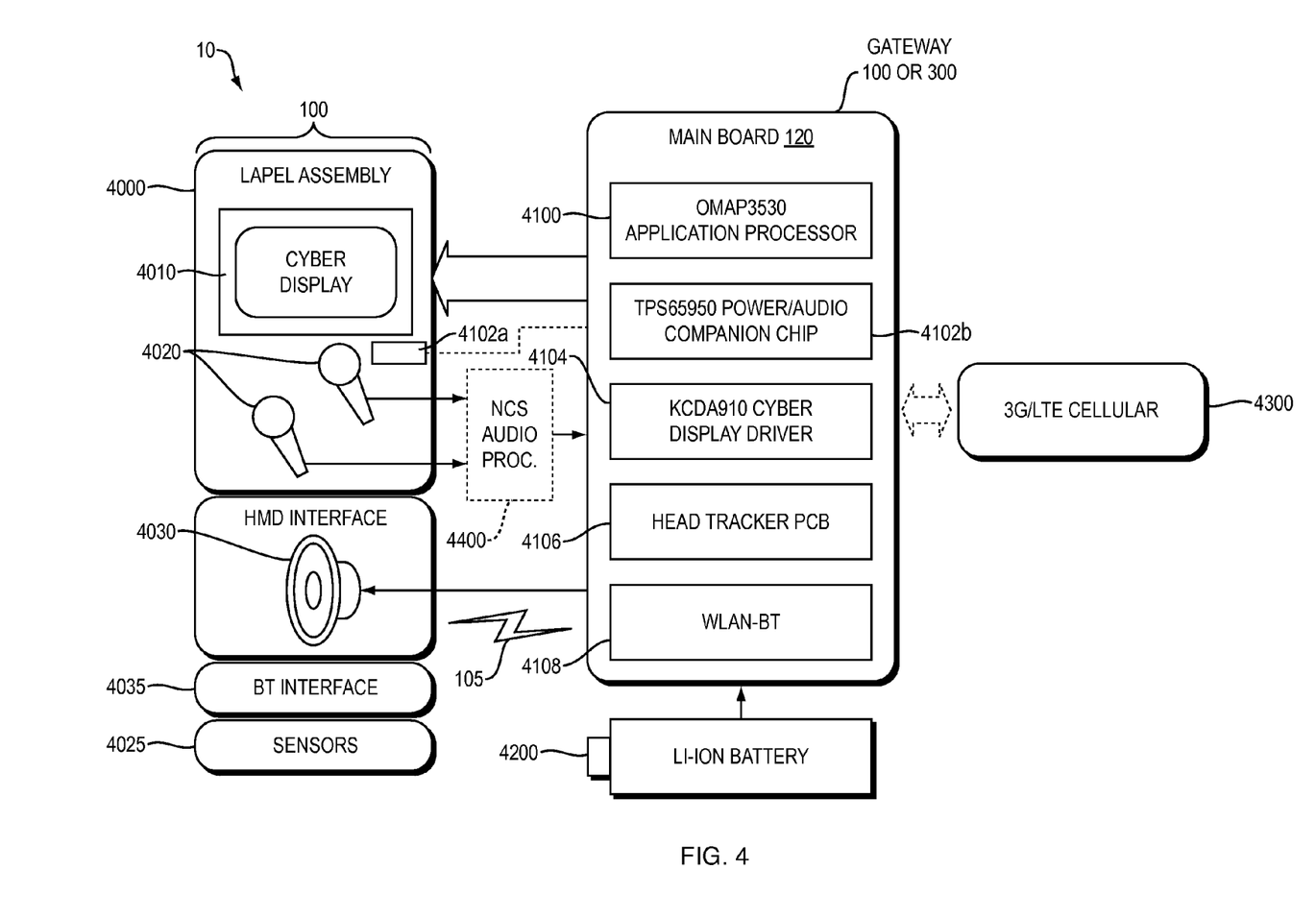
FIG. 4 is a high level block diagram of the electronics components of the system.

FIG. 4 is a simplified high level block diagram of a non-limiting example embodiment of the system 10 including lapel unit 100 and optional gateway 300.

The lapel unit 100 (4000) includes the microdisplay 4010, one or more microphones 4020, one or more speakers 4030, one or more sensors 4025, and Bluetooth interface 4035.

Other system electronics are placed on or in a desired location in either the lapel unit 100 or gateway 300. These include an Open Media Application Platform (OMAP) application processor 4100, a power/audio companion chip 4102, a display driver 4104, a motion tracker circuit board 4106 and wireless LAN/Bluetooth interface 4108. Also included is a power source, such as a lithium ion battery 4200.

Movements of the user's body result in motions of lapel unit 100 that are detected using the sensors 4025. Movement sensors 4025 may be Hall effect sensors, MIM diodes, accelerometers, gyros, transducers, 3 axis to 9 axis degrees of freedom orientation sensors, GPS, digital compass (multi-axis magnetometer) or other sensors. Optical detectors, cameras and other sensors detect hand motions and/or user gesture inputs. Thus, located within lapel unit 100 (or gateway 300) are circuits including one or more sensors fed to motion tracker 4106 to track the motion and/or position of the user's head, hands and/or body in at least a first axis (horizontal), but preferably also a second (vertical), a third (depth), a fourth (pitch), a fifth (roll) and a sixth (yaw) axis. A magnetometer (digital compass) can optionally be added to provide the system 10 with a full 9 axis degrees of freedom positional accuracy. For example, the sensors can detect the user twisting their head and shoulders to the left or right, leaning forward or back, tipping of head up or down, and/or waving or moving their hands in particular gestures such as a hand swipe to the left.

In particular embodiments, the microphones 4020 provide audio signals to audio processing circuit (NCS module 4400). The NCS module 4400, which may reside in either the lapel unit 10 or gateway 300, processes received microphone signals to provide voice command recognition functions, and produce audio signals to power/audio companion chip 4102.

The voice and/or motion inputs can be used separately and/or combined to determine the input commands. For example, a user may initially see a center portion of the screen and may select one of two modes with a voice command: either (a) "move cursor" mode or (b) "pan/zoom" mode. Selecting the first of these modes with a voice command, the user can then use hand gestures or head movements to cause the cursor to move around within the virtual display area. However, the user may then issue another vocal command such as "SELECT PAN", causing the screen to pan out, allow the user to better see a different part of the virtual display area. Next, in this example, using the hand or head movements and speaking some other "SELECT" vocal command, the user may then further change the field of view.

In another example of using a head movement and voice command to navigate web pages using a web browser, the user can select a move mode and use a head movement to position the cursor at a particular hyperlink of interest. Using the voice command "SELECT", the selected hyperlink is then activated. The browser then moves forward to the selected web page. Thus, using hand or head movements, the user can select from among multiple hyperlinks displayed on a web page, and using a vocal command, then cause that hyperlink to be selected.

Other combinations of hand/head movements and vocal commands may cause web pages to be scrolled up and down, page back or forward, or implement other typical browser commands.

System 10 may also receive inputs from external input devices such as a wireless mouse, track ball, or keyboard that may be wirelessly connected through the Bluetooth and/or WiFi interface 4108.

The OMAP processor 4100 may include a central processing unit, and memory such as Random Access Memory (RAM) that may include SDRAM and/or Read Only Memory (ROM). The OMAP may be a Texas Instruments model OMAP 3530 processor or newer version sold by Texas Instruments, Inc. and used as a multimedia processor. In this example, a TPS 65950 power/audio companion chip also available from Texas Instruments, is used to provide audio, USB, voice recognition, gesture, keypad, and/or touchpad control and battery charging functions to the system.

The WLAN/Bluetooth module 4108 may be an LBEE 1W8 NEC-interface, a module available from CSR Ltd. of Cambridge, United Kingdom, or other similar wireless interface with lesser or greater capabilities. Wireless interface 4108 in the separate gateway 300 can be operated at very low power, needing to only emit sufficient power to close a link between unit 100 and gateway 300. Power levels may even be user selectable.

The display driver 4104 may be a model KCD-A 910 display driver available from Kopin Corporation of Westborough, Mass. The microdisplay 4010, also available from Kopin can include CyberDisplay models 113LV, 152LV, 230LV, WQVGA, or other manufactures acceptable microdisplays.

The gateway 300, if used, therefore contains certain electronic functionality for content and communications processing, wireless command and control, and for Bluetooth, WiFi and/or cellular radio interface support of lapel unit 100 and host 200. As a result, the microdisplay, microphone(s), and head position, movement and body gesture tracking sensors and short range, low power Bluetooth and/or WiFi interface only are packaged in the lapel unit 100. High power processor 4100, and circuits 4102, WLAN communication functionality 4108 (e.g., WiFi, WiMax, Zig bee, 3G and 4G cellular, etc.) and certain other portions of the head position, movement and gesture tracker portions, enhanced by advanced signal processing and voice recognition functions are packaged only in the gateway 300. Furthermore, functionality of the display driver 4104 may be split between a minimal implementation (4102A) in the lapel unit 100 with the remainder (4102B) in gateway 300. Functions such as the long range wireless GSM, CDMA, WiMax, Zigbee, 3G, 4G LTE or other like long rang wireless circuitry requiring relatively high power also are preferably only located in the gateway 300 in this embodiment.

Additional functionality in the gateway 300 may include additional solid state memory, compact hard drive, memory cards, USB and many USB connectors, broadcast TV, radio and/or closed circuit audio/video connectivity, external displays and the like as discussed in connection with FIGS. 2B and 2C above. Referring to FIG. 4, for example, the items on the right hand side of the page are packaged in the belt-worn gateway 300, including the OMAP processor 4100, power/audio companion chip 4102, and display driver 4104. Motion, position and gesture tracking functions, Bluetooth and/or WiFi 4106 and portions of Bluetooth and/or WiFi and/or Cellular functions 4108 may be packaged in the lapel unit 100, with WLAN communication functionality and certain other portions of the motion, position and gesture tracking and advanced signal processing and voice recognition functions may be packaged in the gateway 300.

As a result of the separate packaging of components discussed above, rather than a need to contain all functions designed for the system in a single heavy head-worn form factor, the same functions can be provided in a shoulder or lapel-worn unit.

Additional functionality can be placed away from the lapel onto the user's beltline with the optional gateway. Therefore, by moving as many functions as possible away from the head, leaving only what is absolutely necessary in the lapel component itself, a number of advantages are provided. The headset is eliminated entirely. The lapel unit generally generates only lower power, short range Bluetooth and/or WiFi signals requiring less battery power, and moving the circuitry that generates the higher power, longer range, potentially more harmful wireless communications signals to the user's belt. The heavier components, such as larger batteries, larger memory capacity, cell phone modems and the like needed for long range communication are also moved to the user's beltline.

Heavier optional components, such as larger batteries, added memory capacity, touch screens, touch pads, pico projector, cell phone modems and the like needed for extended, demanding applications and long range communication can be moved to the user's beltline to gateway 300, and off of the lapel.

Thus, the user is given greater freedom in which devices are attached to his body and only as he needs, and he uses only familiar handheld microphone sized devices.

Figure 5:
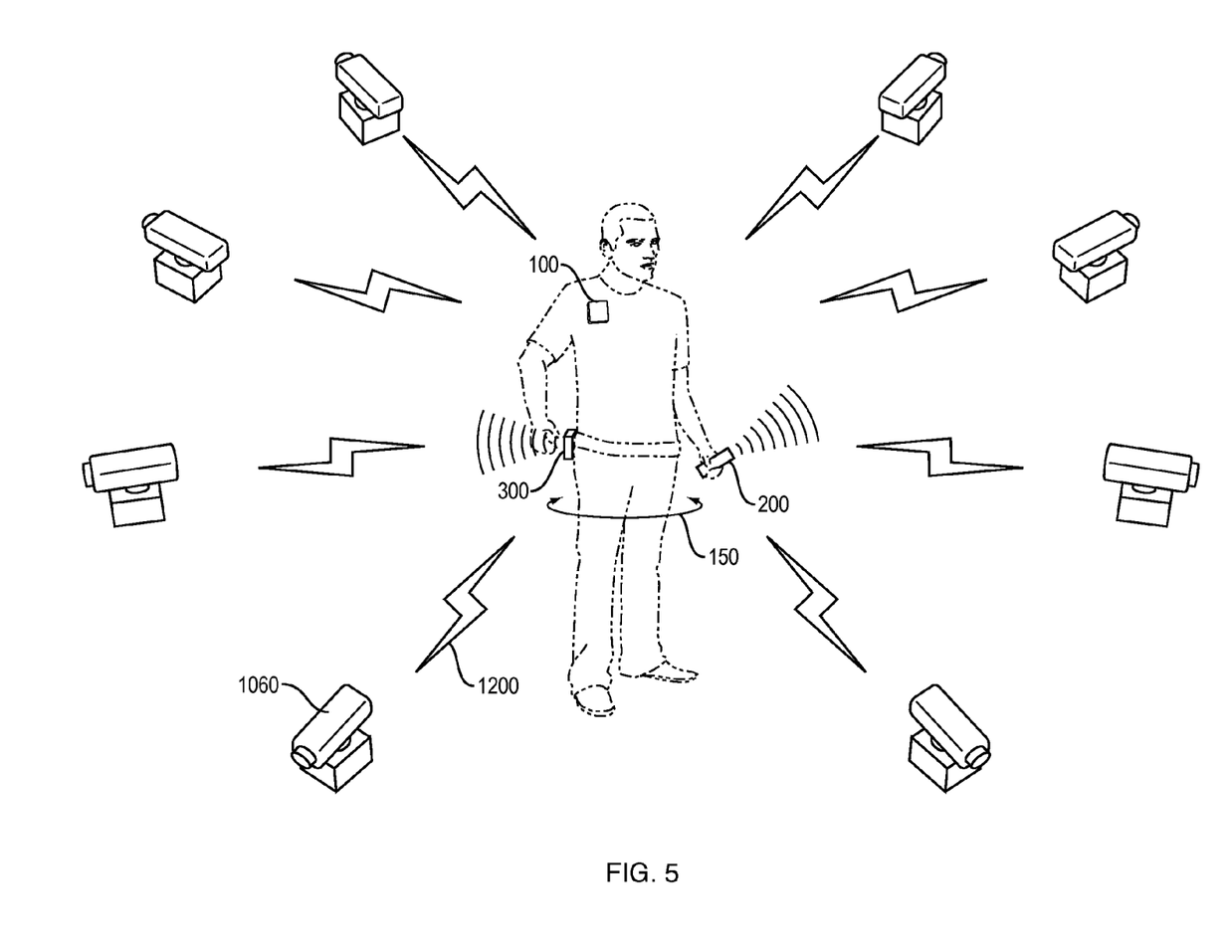
FIG. 5 illustrates a use case where the lapel unit is used as a remote display and control for a set of wireless cameras.

FIG. 5 is an example use case for the system 10. Here a first responder needs to investigate an emergency situation or survey a location for suspicious activity. Here the system 10 can control one or more wireless cameras 1060 and/or audio sensor systems. Having central control over multiple wireless cameras can provide "rings" of visual and/or infrared detection. This allows the user, for example, to walk into a dark room, and place a number of the wireless infrared cameras to conduct surveillance in the room.

The user may also place remote camera(s) 1060 in a location and lapel device 100 can be programmed so that it reports only when a remote wireless camera 1060 detects vibration, ambient audio, ambient radio signals, changes in ambient light, changes in image areas scanned, information detected by various sensors (for example, such as a needle on a gage in a machine). The system 10 or host 200 can then be programmed to notify the user only when a change is detected and that a recording is now taking place.

In another application, multiple wireless cameras 1060 can be spread about in different remote locations. The cameras can initially shut down with only the audio microphones activated. When a specified sound is deteched, the cameras can automatically switch-on and make wireless streaming video available as desired. In arrangement at infrared wavelengths, the cameras can be used to look for heat sources such as other people.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A lapel device comprising:
   a shoulder microphone form factor housing, wherein the housing is adapted to mount to a lapel area of a user
   a microdisplay arranged in the housing, for displaying visual information received from a local processor;
   a microphone arranged in the housing, for providing an audio input;
   one or more motion detectors providing one or more motion sensor inputs indicating at least a user motion;
   a wireless communications interface arranged in the housing, for establishing a communications link with a host processor, the host processor being located apart from the lapel device and executing a user command formed and issued by the local processor;
   the local processor arranged in the housing and operatively coupled to the microdisplay, the microphone, the one or more motion detectors, and the wireless interface, and further including:
      one or more receivers, for receiving the audio input and the one or more motion sensor inputs;
      a translator, for translating the one or more motion sensor inputs and/or the audio input into the user command; and
      a display controller, for forwarding further information to be displayed on the microdisplay in response to the host processor execution of the user command.

2. The device of claim 1 further comprising: a second component comprising a wearable housing, the wearable housing adapted to be wearable on a body part other than a head or the lapel area of the user, the second component containing additional electronic circuitry operatively coupled to a second processor.

3. The device of claim 2 wherein the second processor of the second component incorporates one or more of a speech recognizer, gesture recognizer, display driver, or high power wireless communications interface.

4. The device of claim 2 wherein the second component exchanges information with the lapel device via a short range wireless communications interface.

5. The device of claim 4 wherein the wireless communications interface is selected from Bluetooth or WiFi.

6. The device of claim 1 wherein the wireless communications interface further includes a cellular, 3G, 4G, LTE or other long range radio.

7. The device of claim 2 wherein the wearable housing adapted to be wearable on a body part other than the head or the lapel area of the user further comprises a belt clip.

8. The device of claim 1 wherein the motion detector provides two or more motion inputs indicative of the motion of the user along two or more axes.

9. The device of claim 8 wherein the motion detector is a camera for detecting hand and/or body gesture movements of the user.

10. The device of claim 8 wherein the motion detector is a head movement tracking device for detecting 3 axis up to 9 axis degrees of freedom head movements of the user.

11. The device of claim 1 wherein the wireless communications interface establishes a communications link with a host processor arranged in two or more remote cameras or one or more other peripheral devices.

12. The device of claim 1 wherein a reply from the host processor results in information being displayed on the microdisplay.

13. A method of operating a lapel device comprising:
   mounting a lapel device having a shoulder microphone form factor housing to a lapel area of a user, the form factor housing enclosing:
      a microdisplay;
      a microphone;
      one or more motion detectors;
      one or more wireless communication interfaces; and
      a local processor;
   displaying visual information received from the local processor on the microdisplay;
   sensing a user motion using the one or more motion detectors to provide a motion sensor input;
   receiving an audio input using the microphone to provide an audio input
   translating the motion sensor input and/or the audio input into a user command;
   establishing a communications link using the one or more wireless communications interfaces between the lapel device and a host processor, the user command being executable by the host processor, and the host processor being located apart from the lapel device; and
   controlling at least one aspect of the visual information presented on the microdisplay based on the user command as executed by the host processor.

14. The method of claim 13 wherein the aspect of the visual information is a zoom, pan, scale factor and or 3D effect of information displayed.

15. The method of claim 13 additionally comprising:
   forwarding the user command to the host processor using the wireless communications interface, receiving a reply from the host processor as a result of execution of the user command, and using the received reply to control the at least one aspect of the visual information.

16. The method of claim 13 wherein the motion sensor input is indicative of motion of the user in two or more axes.

17. The method of claim 13 wherein one of the one or more motion detectors is a camera and the sensed user motion is a hand movement or body gesture of the user.

18. The method of claim 13 further comprising:

mounting a gateway device having a pager-sized form factor to an area other than the lapel area and a head of the user, the gateway device including a short range wireless communications interface, a long range wireless communications interface, a memory or other storage device, and a gateway processor;

establishing a short range communications link between the lapel device and the gateway device;

forwarding the motion sensor input and the audio input to the gateway processor;

translating the motion sensor input and/or the audio command;

establishing a long range communications link between the gateway device and the host processor;

forwarding the user command to the host processor;

receiving a reply from the host processor, based on the user command, at the gateway device, the reply controlling the at least one aspect of the visual information presented on the microdisplay based on the user command.

19. A lapel microdisplay system comprising:

a lapel device including:

a housing, having a form factor of a lapel microphone, configured to mount to a lapel area of a user, and enclosing:

a microdisplay for displaying visual information received from a lapel device processor;

a microphone, operatively coupled to the lapel device processor, for providing an audio input to the lapel device processor;

a motion detector, operatively coupled to the lapel device processor, for sensing a movement of a body part of the user and providing a motion input based on the sensed movement;

a first short range wireless communications interface operatively coupled to the lapel device processor and establishing a short range communications link between the lapel device and a gateway device, and the first short range wireless communications interface forwarding the audio input and the motion input from the lapel device to the gateway device;

the gateway device, having a pager-sized form factor, configured to mount to an area of the user other than the lapel area and head of the user, and further including:

a second short range wireless communications interface, operatively coupled to a gateway processor, for communicating with the lapel device;

a first long range wireless communications interface, operatively coupled to the gateway processor, for establishing a second communications link between the gateway device and a host device;

the gateway processor in response to communications with the lapel device translating the audio input and motion input into a user command executable by the host device and forwarding the user command to the host device using the first long range communications interface; and the host device, including a second long range communications interface for communicating with the gateway device, the host processor generating a reply including further visual information to be displayed on the microdisplay of the lapel device based on results of executing the user command, and forwarding the reply to the gateway device, the gateway device relaying the reply including the further visual information to the lapel device for responsively displaying on the microdisplay.

* * * * *